(12) United States Patent
Tsubouchi et al.

(10) Patent No.: US 6,645,022 B2
(45) Date of Patent: Nov. 11, 2003

(54) OUTBOARD MOTOR

(75) Inventors: Masanori Tsubouchi, Wako (JP); Kouichi Azuma, Wako (JP); Hideki Nemoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/068,451

(22) Filed: Feb. 7, 2002

(65) Prior Publication Data

US 2002/0111088 A1 Aug. 15, 2002

(30) Foreign Application Priority Data

Feb. 14, 2001 (JP) ........................................ 2001-037603

(51) Int. Cl.[7] .............................................. B63H 21/38
(52) U.S. Cl. ...................................... 440/77; 440/88 A
(58) Field of Search .......................... 440/88, 77, 88 A; 123/195 C, 195 P

(56) References Cited

U.S. PATENT DOCUMENTS 6,293,839 B1 * 9/2001 Tsunoda et al. ....... 123/179.28
6,383,044 B1 * 5/2002 Nemoto et al. .......... 123/195 P
2002/0025741 A1 * 2/2002 Tsubouchi et al. ............ 440/88
2002/0111086 A1 * 8/2002 Ikuma et al. .................. 440/88
2002/0111089 A1 * 8/2002 Tsubouchi et al. ............ 440/88

FOREIGN PATENT DOCUMENTS

| JP | 06033790 | | 2/1994 |
| JP | 11-200878 | * | 7/1999 |
| WO | WO98/27325 | * | 6/1998 |

* cited by examiner

Primary Examiner—Sherman Basinger
(74) Attorney, Agent, or Firm—Adams & Wilks

(57) ABSTRACT

An outboard motor comprises an engine cover having an air intake opening for taking in air, an engine disposed in the engine cover, and an AC generator disposed in the engine cover for generating electricity to drive the engine. A cooling air guide member is disposed in the engine cover for guiding the air taken in by the air intake opening towards the AC generator. The cooling air guide member has a bottom wall, a pair of side walls extending upwardly from opposite side edges of the bottom wall, and an opening extending through the bottom wall so that the air taken in by the intake opening is guided by the side walls and the bottom wall to flow through the opening to cool the AC generator.

16 Claims, 5 Drawing Sheets

OUTBOARD MOTOR

FIELD OF THE INVENTION

The present invention relates to an improvement in an outboard motor, and in particular to a structure for cooling an AC generator provided to an engine of the outboard motor.

BACKGROUND OF THE INVENTION

Outboard motors include engines, auxiliary devices disposed in the vicinity of the engines, and engine covers covering the engines and the auxiliary devices. Within the engine covers, there are also disposed AC generators.

The engines have vertically extending crankshafts. Cylinder heads, intake systems, and exhaust systems are disposed in rear parts of space formed within the engine covers. The AC generators are provided in front of the engines.

The crankshafts drive the generators by transmitting their motive powers thereto by means of belts and pulleys extending around the belts.

The outboard motors discussed above are known from, for example, Japanese Patent Laid-Open Publication No. HEI 6-33790. A generator disclosed in the publication is disposed adjacent a front part of an engine. The generator undesirably emits heat when producing electricity. The generator and its associated electronic devices are adversely affected by the heat produced by the generator. The generator needs to be cooled down.

Belts and pulleys extending around the belts to drive the generator are unavoidably positioned above the engine because a crankshaft of the engine is oriented vertically. This requires the generator to be positioned at a high level in front of the engine. An engine cover is disposed to cover upper parts of the engine and the generator. The generator and the engine cover have only a very small space formed therebetween.

The generator thus arranged can be cooled down with decreased efficiency. It has been propose to provide a large space between the generator and the engine cover. However, providing such a larger space increases a height of the engine cover. The outboard motor having such an engine cover of increased height is undesirably rendered large in size.

SUMMARY OF THE INVENTION

An object of the present invention is to provide an outboard motor including a generator-cooling structure disposed in a small space formed above a generator of the outboard motor, such that the generator is advantageously cooled down.

According to one aspect of the present invention, there is provided an outboard motor comprising: an engine having a vertically extending crankshaft; an AC generator disposed adjacent the engine; a cooling air guide member disposed above the engine, the cooling air guide member having an opening formed at a portion thereof opposed to the AC generator; and an engine cover covering the engine, the AC generator, and the cooling air guide member.

The generator-cooling structure is disposed above the generator. The structure has the opening formed at a portion thereof opposed to the generator. Air for cooling the generator flows through the opening to cool the generator.

In a preferred form of the present invention, the cooling air guide member is recessed to form a space extending in a front-and-rear direction of the outboard motor, and the cooling air guide member includes a bottom part having the opening formed therein. In a further preferred form of the present invention, the AC generator is disposed adjacent a front part of the engine. Preferably, an outboard motor further comprises an air intake silencer disposed above the engine, the air intake silencer extending in a front-and-rear direction of the engine and having the cooling air guide member attached to a front part thereof.

The structure is recessed to form the space extending in the front-and-rear direction of the outboard motor. The structure includes the bottom part having the opening formed therein.

The structure of recessed configuration provides the space or a duct-shaped passage way through which the air for cooling the generator flows, even if the former is positioned in a small space between the generator and the engine cover. This arrangement eliminates the need for an engine cover having a height larger than required. It therefore becomes possible to render the outboard motor compact. It also becomes possible to provide an improved freedom to design the outboard motor.

Since the structure is attached to the front part of the silencer disposed above the engine, there is no need to provide the engine with particular components such as stays for attaching of the structure to the engine. This facilitates providing the structure to the outboard motor.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
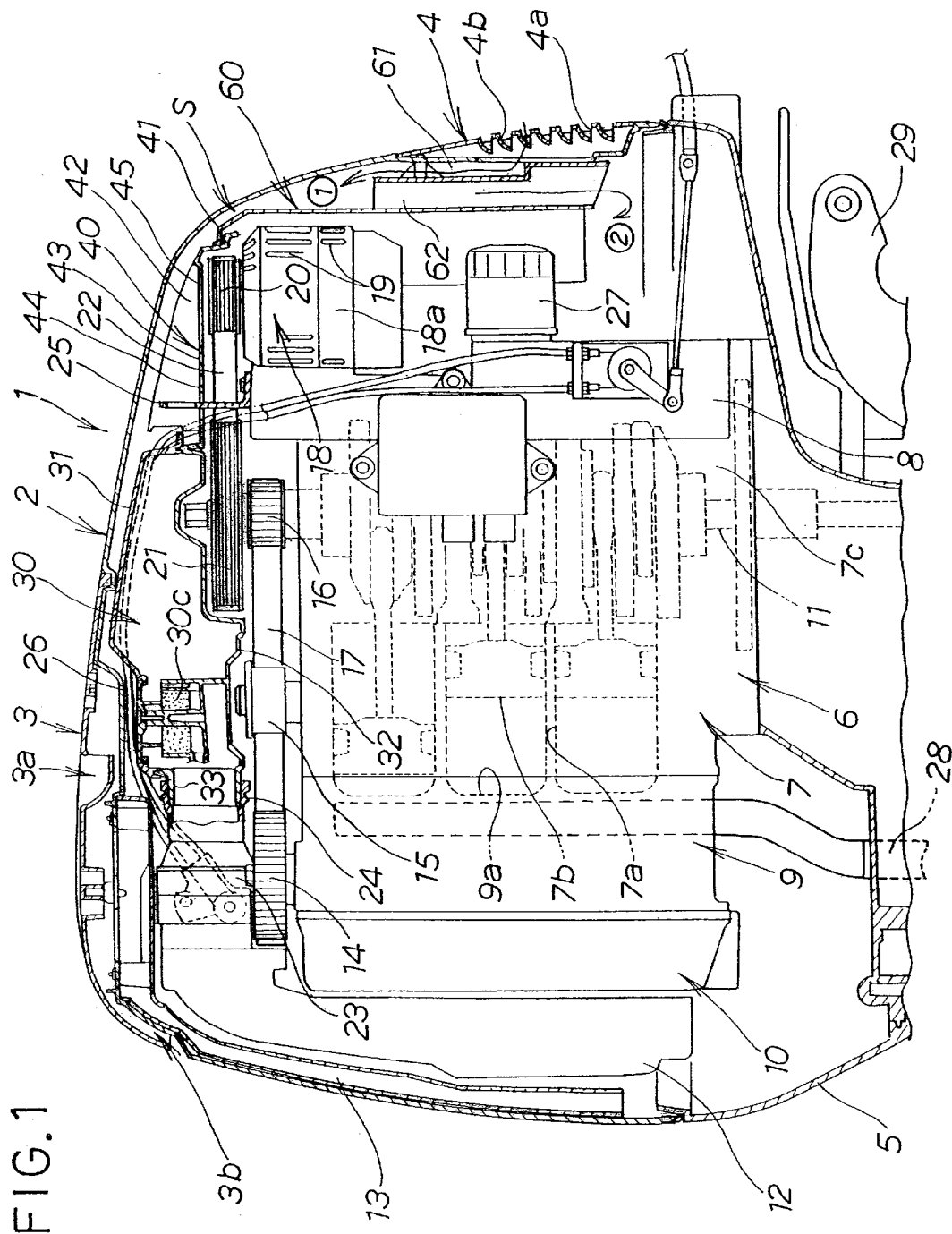
FIG. 1 is a cross-sectional view of an upper part of an outboard motor.

Referring to FIG. 1, an outboard motor 1 includes an engine 6 and auxiliary devices disposed around the engine 6. The engine 6 and the devices are covered with an engine cover 2. The engine cover 2 includes a top cover 3 and a front cover 4. The top cover 3 is a rear part of the engine cover 2. The front cover 4 extends forwardly from the top cover 3. The front cover 4 has slits 4a formed in a lower part thereof. The slits 4a are arranged to take in air from outside the outboard motor 1. An under cover 5 is mounted under the engine cover 2. An extension case (not shown) is disposed below the under cover 5. Mounted below the extension case is a gear case including a screw.

The engine 6 includes a cylinder block 7 disposed centrally thereof. The cylinder block 7 includes its skirt portion 7c having a crankcase 8 disposed forwardly thereof. Cylinder heads 9, 9 are disposed behind the cylinder block 7. Cylinder head covers 10, 10 are positioned behind the cylinder heads 9, 9. The engine 6 further includes a vertically extending crankshaft 11. Within the cylinder block 7, there are disposed two sets of three cylinders 7a each horizontally oriented. The cylinders 7a of each set are vertically juxtaposed. Each cylinder 7a has a piston 7b disposed therein. The piston 7b is connected via a connecting rod to the crank shaft 11. Formed in the cylinder head 9 are combustion chambers 9a provided in correspondence to the number of the cylinders 7a.

Figure 5:
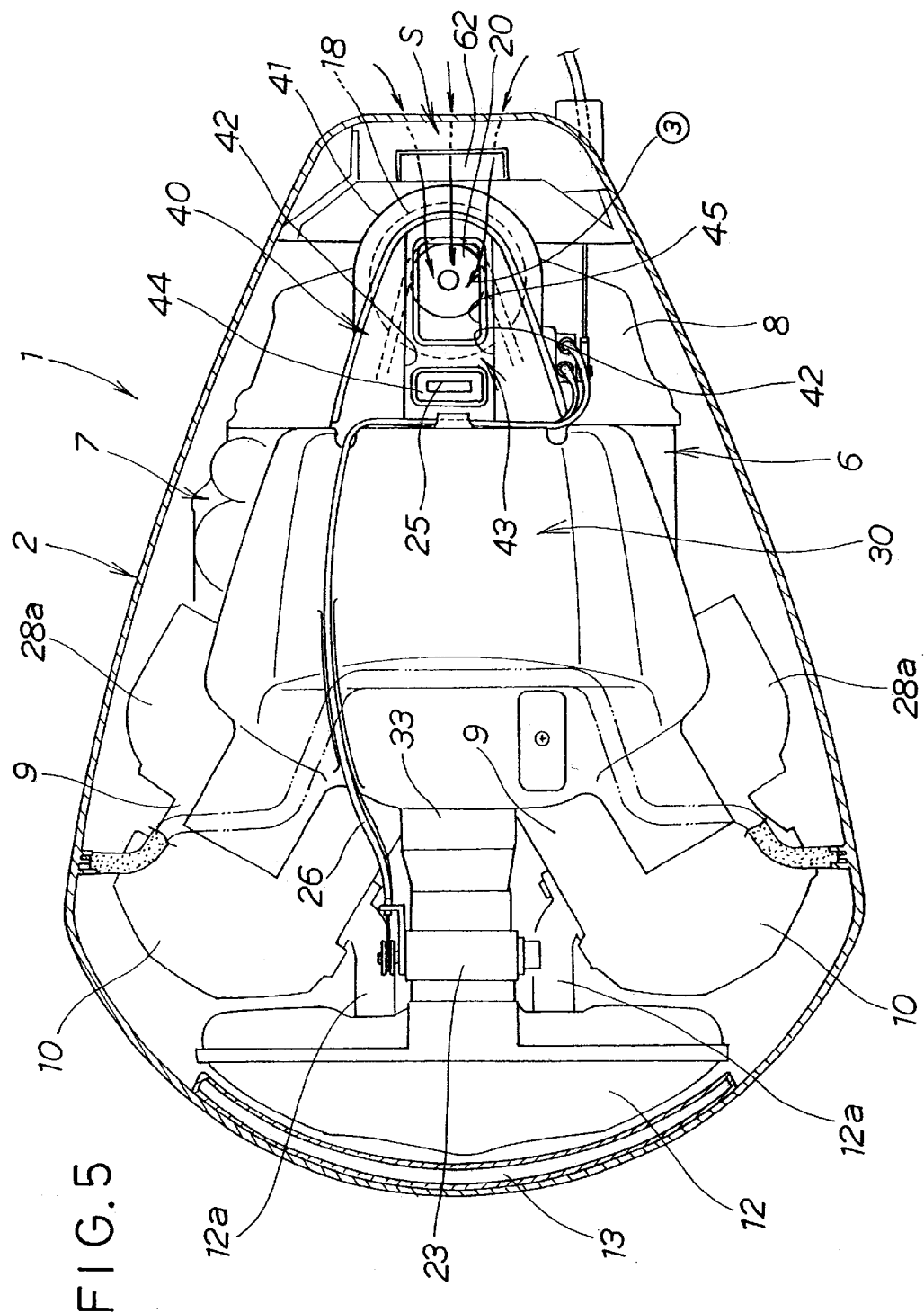
FIG. 5 is a top plan view showing, partly in cross-section, the upper part of the outboard motor.

The engine 6 is a V-six engine (see FIG. 5). More specifically, the cylinder block 7 has the horizontally oriented six cylinders 7a three of which are disposed on one of right and left sides thereof. The other three cylinders are disposed on the other side.

Behind the cylinder heads 9, 9, there is positioned an intake manifold 12 extending vertically. An outside air intake guide member 13 for taking in air from outside the outboard motor 1 is provided behind the intake manifold 12.

A camshaft pulley 14 is positioned above the cylinder head 9. A guide pulley 15 is located above a rear part of the cylinder block 7. Above the skirt portion 7c, there is disposed a first driving pulley 16 to be driven by the crankshaft 11. A timing belt 17 extends around the pulleys 14, 16. The crankshaft 11 drives a camshaft via the timing belt 17.

The engine 6 has an AC generator 18 adjacent a front part thereof. In other words, the generator 18 is attached to a front side of an upper portion of the crankcase 8 forming the front part of the engine 6. The generator 18 includes a vertically extending drive shaft. A body 18a of the generator 18 includes an upper part, an intermediate part, and a lower part all of which have vertically elongated slits 19 formed therein.

On an upper surface of the generator 18, there is provided a driven pulley 20 for driving the generator 18. Provided at an upper part of the crankshaft 11 is a second driving pulley 21. The second driving pulley 21 is positioned above the first driving pulley 16 in a coaxial relation thereto. A timing belt 22 extends around the pulleys 20, 21. The crankshaft 11 drives the generator 8 by transmitting a motive power thereto via the timing belt 22 and pulleys 20, 21.

Above these pulleys and timing belts positioned above the engine 6, there is disposed an air intake silencer 30 of box-shaped configuration. The silencer 30 extends in a front-and-rear direction of the engine 6.

Figure 2:
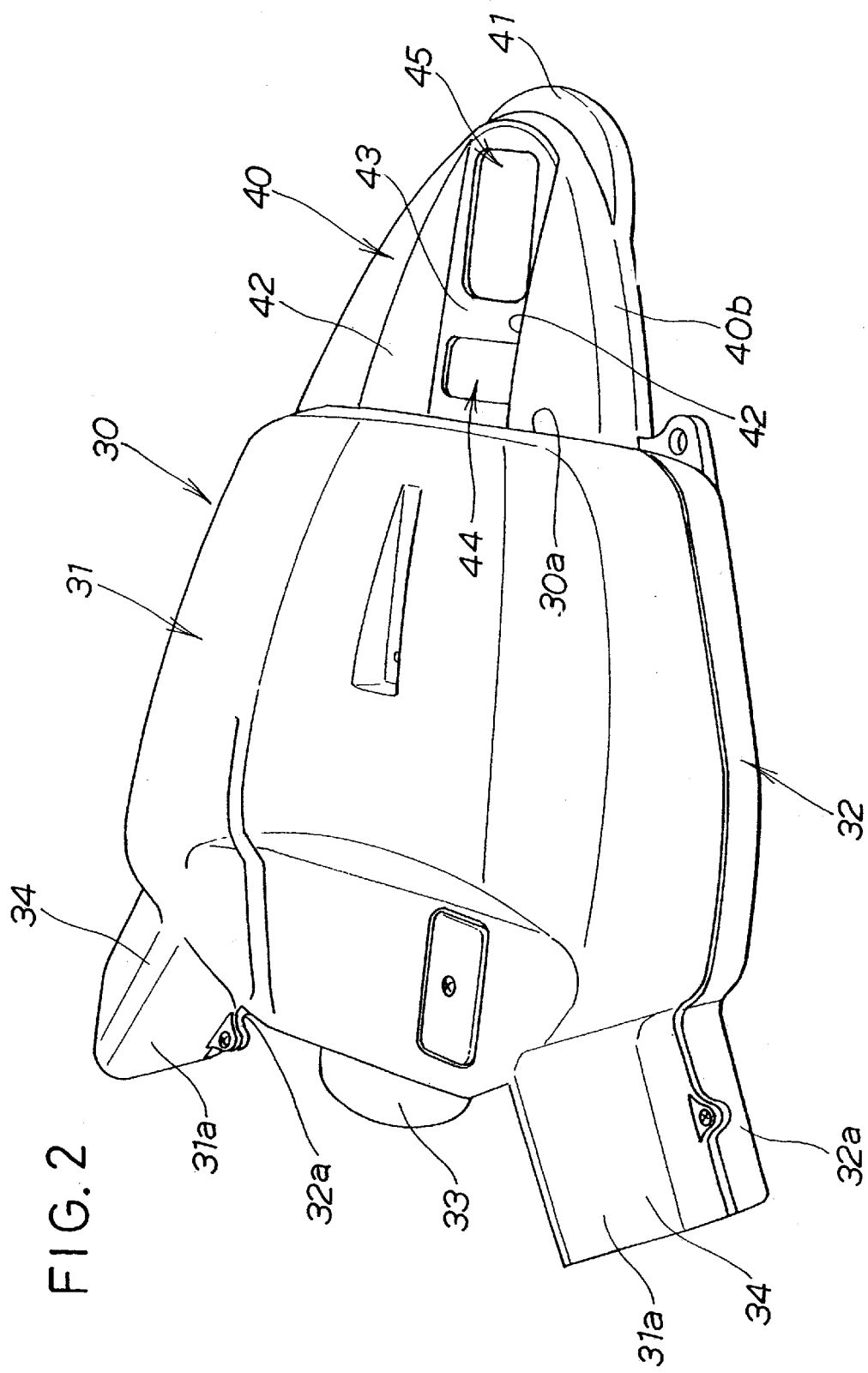
FIG. 2 is a perspective view of an air intake silencer of the outboard motor.
Figure 3:
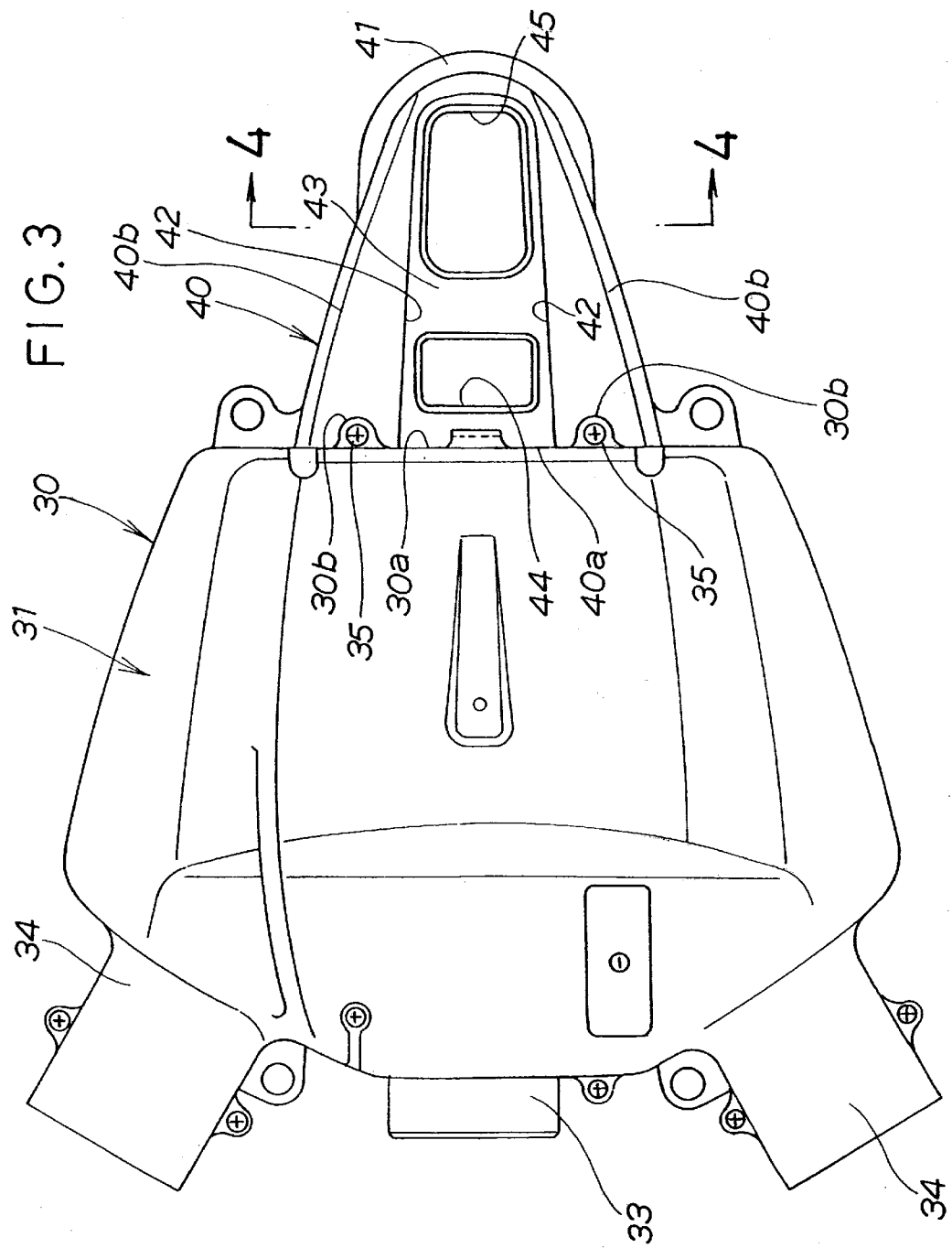
FIG. 3 is a top plan view of the silencer.
Figure 4:
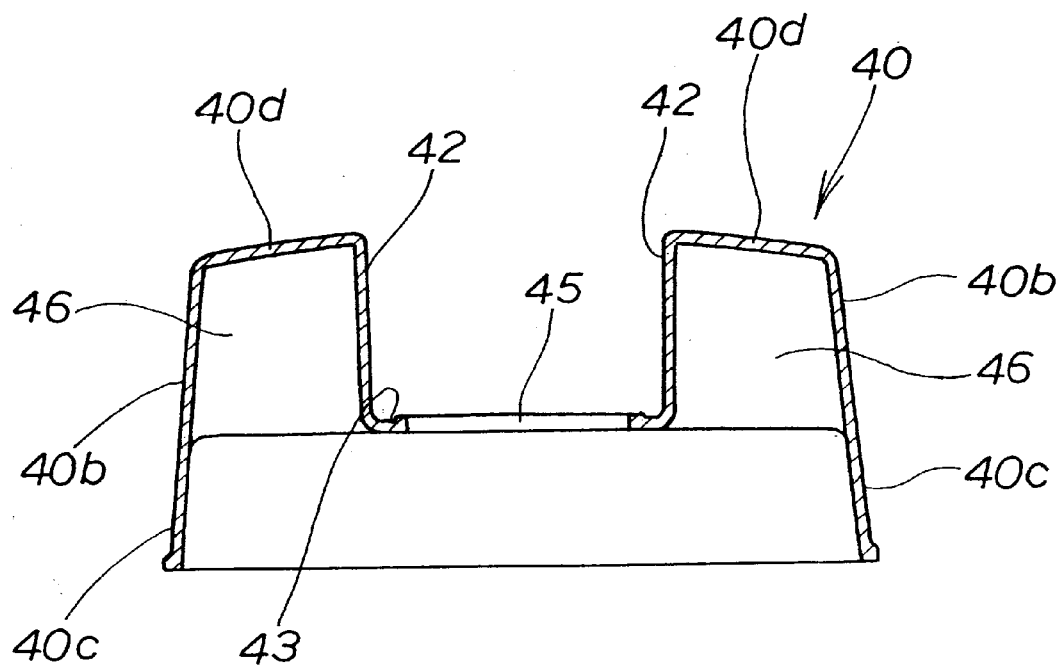
FIG. 4 is a cross-sectional view taken along line 4—4 of FIG. 3.

Referring to FIG. 2 to FIG. 4, the silencer 30 will be described hereinbelow.

The silencer 30 includes upper and lower halves 31, 32 joined together. The halves 31,32 are of small thickness.

A throttle valve device 23 is disposed proximate and above the cylinder heads 9, 9. The device 23 has an intake port formed upstream thereof. The intake port is connected through a grommet 24 to a cylindrical intake connecting duct 33. The duct 33 is positioned centrally of a rear side of the lower half 32. The port 33 projects backwardly from the rear side of the lower half 32.

Outside air intake ducts 34, 34 project backwardly from at right and left ends of a rear part of the silencer 30, respectively. The ducts 34, 34 are slightly inclined outwardly. The respective halves 31, 32 have upper and lower recessed portions 31a, 32a provided in symmetric relation to each other.

Joined or attached to a front part 30a of the silencer 30 is a cooling air guide member 40 for cooling the generator 18. The guide member 40 is positioned above the generator 18 and extends in the front-and-rear direction of the engine 6.

The guide member 40 is widened at a rear part 40a thereof. A front part of the guide member 40 is reduced in width. The front part of the guide member 40 has a flat projection portion 41 protruding therefrom.

The guide member 40 is smaller in width than the silencer 30. The rear part 40a is fixedly attached via screws 35, 35 to boss portions 30b, 30b provided rightwardly and leftwardly of the front part 30a of the silencer 30.

At both right and left sides of the guide member 40, there are provided erected walls 42, 42 extending vertically. The erected walls 42, 42 are reduced in height towards a front end thereof. A bottom part 43 of the guide member 40 is formed between the walls 42, 42. The bottom part 43 is contiguous with bottoms of the walls 42, 42. The guide member 40 is recessed or U-shaped to form a space extending in a front-and-rear direction of the outboard motor 1. More specifically, the walls 42, 42 and the bottom part 43 cooperate to provide a recess as viewed in front elevation. That is, the guide member 40 is of U-shaped cross-section. Upper parts 40d, 40d extend outwardly from tops of the walls 42, 42.

The upper parts 40d, 40d have sidewalls 40b, 40b extending downwardly from outer edges thereof. The wall 42, the upper parts 40d, 40d, and the side wall 40b define a space 46 in cooperation with each other. The side walls 40b, 40b extends further downwardly to terminate at a level below the bottom part 43. Lower edges 40c, 40c are formed at such a level.

The bottom part 43 has an opening 44 formed in a rear half portion thereof. The opening 44 is elongated transversely of the guide member 40. The bottom part 43 also has an opening 45 formed at a front half portion thereof. The front half portion of the bottom part 43 is opposed to the generator 18. The opening 45 is elongated in a front-and-rear direction of the guide member 40. The aforementioned silencer 30 and guide member 40 are made from synthetic resin.

As shown in FIG. 1, the silencer 30 is disposed above the engine 6, or the timing belts 17, 22 and the pulleys 14, 15, 16.

The guide member 40 extending forwardly from the silencer 30 is positioned above the belt 22 and the pulley 20. The guide member 40 surrounds the belt 22 and the pulley 20. A stay 25 extends through the opening 44 formed at the rear half portion of the bottom part 43, as shown in FIG. 5. The opening 45 is positioned above the pulley 20.

A control cable 26 is provided for controlling an amount by which a throttle valve of the throttle valve device 23 is opened. The control cable 26 extends along one side of an upper surface of the silencer 30 to the rear part 40a of the guide member 40. The cable 26 then goes downwardly from the rear part 40a of the guide member 40 alongside the crankcase 8 to the front side of the outboard motor 1. Reference numeral 27 denotes an oil filter. An exhaust pipe 28 extends downwardly from the outboard motor 1. A stern bracket 29 is interposed between the under cover 5 and an extension case (not shown).

The duct 33 has a filter 30c provided upstream thereof. The filter 30c removes a mist from a blow-by gas.

The top cover 3 includes a recessed portion 3a. An operator can cause the outboard motor 1 to pivot upwardly, gripping the recessed portion 3a. A slit 3b for taking in air form outside the outboard motor 1 is formed below the top cover 3. A cover 60 has its upper half part covering a front part of the generator 18. The cover 60 includes first and second passageways 61, 62 formed at a lower half part thereof. The second passageway 62 is provided behind the first passageway 61. When flowing these passageways 61, 62, a mixture of water and air is separated into the water and the air.

Referring to FIG. 5, the V-six engine 6 includes the cylinder block 7, the right and left cylinder heads 9, 9, and the right and left cylinder head covers 10, 10 to provide the V-shaped configuration as viewed in top plan. Reference numerals 28a, 28a designate right and left exhaust manifolds. Intake pipes 12a, 12a are connected to intake ports of the individual cylinder heads 9, 9.

As is apparent from FIG. 5, the generator 18 is positioned below the longitudinally elongated opening 45 of rectangular contour.

Description will be made as to how the guide member 40 is operated, with reference back to FIG. 1. Air outside the outboard motor 1 passes through the slits 4a and an opening 4b and flows up through the first passageway 61, as shown by an arrow ①, into a space S formed between an upper part of the front cover 4 and the cover 60. Part of the air flows downwardly through the second passageway 62 and then is directed upwardly to cool the generator 18, as indicated by an arrow ②.

The air which has passed through the space S flows towards the guide member 40. The guide member 40 is opened at its front part. The guide member 40 includes the walls 42, 42 formed on the right and left sides thereof, and the bottom part 43 positioned between the bottoms of the walls 42, 42 such that the guide member 40 is U-shaped as viewed in cross-section. The walls 42, 42 and the bottom part 43 thus jointly define the space elongated longitudinally of the guide member 40. With this arrangement, the air flows through the thus elongated space towards the rear end 40a.

After passing through the space S, the air is directed over the bottom part 43 into the opening 45 formed at the front half portion of the bottom part 43, as shown by an arrow ③. The air flowing through the opening 45 cools the generator 18.

Although the bottom part 43 has the openings 44, 45 formed therein, the former may have formed therein the opening 45 alone. This is because not the opening 44 but the opening 45 helps cool the generator 18.

The present disclosure relates to the subject matter of Japanese Patent Application No. 2001-037603, filed Feb. 14, 2001, the disclosure of which is expressly incorporated herein by reference in its entirety.

What is claimed is:

1. An outboard motor comprising:
   an engine having a vertically extending crankshaft;
   an engine cover covering the engine and having a front part and an opening formed at the front part for taking air into the engine cover;
   an AC generator disposed adjacent the engine within the engine cover; and
   a cooling air guide member disposed above the AC generator within the engine cover for guiding the air taken in from the opening of the front part of the engine cover towards the AC generator, the cooling air guide member having a single opening disposed directly above the AC generator and a generally U-shaped groove extending in a front-and-rear direction of the engine cover, the groove having a bottom wall and a pair of side walls extending upwardly from opposite side edges of the bottom wall, the opening of the cooling air guide member being formed in the bottom wall of the groove so that the air taken in from the opening of the front part of the engine cover is guided by the side walls of the groove to flow through the groove and the opening of the cooling air guide member to cool the AC generator.

2. An outboard motor as claimed in claim 1; wherein the AC generator is disposed adjacent a front part of the engine.

3. An outboard motor as claimed in claim 1; further comprising an air intake silencer disposed above the engine, the air intake silencer extending in a front-and-rear direction of the engine and having a front part connected to the cooling air guide member.

4. An outboard motor according to claim 1; wherein the bottom wall of the groove of the cooling air guide member has a front end portion and a rear end portion opposite the front end portion; and wherein the opening of the cooling air guide member extends from the front end portion towards the rear end portion of the bottom wall of the groove.

5. An outboard motor comprising: an engine cover having an air intake opening for taking in air; an engine disposed in the engine cover; an AC generator driven by the engine and disposed in the engine cover; and a cooling air guide member disposed in the engine cover for guiding the air taken in by the air intake opening towards the AC generator, the cooling air guide member having a bottom wall, a pair of side walls extending upwardly from opposite side edges of the bottom wall, and an opening extending through the bottom wall so that the air taken in by the intake opening is guided by the side walls and the bottom wall to flow through the opening to cool the AC generator.

6. An outboard motor according to claim 5; wherein the opening of the cooling air guide member is disposed directly above the AC generator.

7. An outboard motor according to claim 5; wherein the bottom wall and the side walls of the cooling air guide member define a generally U-shaped groove.

8. An outboard motor according to claim 5; wherein the bottom wall of the cooling air guide member has a front end portion and a rear end portion opposite the front end portion; and wherein the opening of the cooling air guide member extends from the front end portion towards the rear end portion of the bottom wall.

9. An outboard motor according to claim 5; wherein the bottom wall of the cooling air guide member has a front end portion and a rear end portion opposite the front end portion; and wherein the side walls of the cooling air guide member extend and converge from the rear end portion to the front end portion of the bottom wall.

10. An outboard motor according to claim 5; wherein the cooling air guide member is disposed above the AC generator.

11. An outboard motor according to claim 10; wherein the opening of the cooling air guide member is disposed directly above the AC generator.

12. An outboard motor according to claim 5; wherein the AC generator is disposed adjacent a front part of the engine.

13. An outboard motor according to claim 5; further comprising an air intake silencer disposed above the engine and having a front end connected to a rear end of the cooling air guide member.

14. An outboard motor comprising:
   an engine cover having an air intake opening for taking in air;
   an engine disposed in the engine cover;
   an AC generator driven by the engine and disposed in the engine cover; and
   a cooling air guide member disposed in the engine cover for guiding the air taken in by the air intake opening towards the AC generator, the cooling air guide member having a channel through which the air taken in by the intake opening flows, the channel comprising a generally U-shaped groove, and an opening which opens into the channel so that the air taken in by the intake opening is guided by the channel and flows through the opening to cool the AC generator.

15. An outboard motor comprising:

an engine cover having an air intake opening for taking in air;

an engine disposed in the engine cover;

an AC generator driven by the engine and disposed in the engine cover; and a cooling air guide member disposed in the engine cover for guiding the air taken in by the air intake opening towards the AC generator, the cooling air guide member having a channel through which the air taken in by the intake opening flows, the channel having a base portion having a front end and a rear end opposite the front end, the base portion having opposite side edges converging from the rear end to the front end, and an opening which opens into the channel so that the air taken in by the intake opening is guided by the channel and flows through the opening to cool the AC generator.

16. An outboard motor according to claim 15; wherein the opening of the cooling air guide member extends through the base portion of the channel.

* * * * *